United States Patent [19]

Noda

[11] Patent Number: 4,602,306
[45] Date of Patent: Jul. 22, 1986

[54] RECORDER/REPRODUCER APPARATUS WITH A DISC-SHAPED RECORD MEDIUM

[75] Inventor: Yasushi Noda, Tokyo, Japan

[73] Assignee: Teac Corporation, Tokyo, Japan

[21] Appl. No.: 434,400

[22] Filed: Oct. 14, 1982

[30] Foreign Application Priority Data

Oct. 30, 1981 [JP] Japan .................................. 56-174226
Oct. 30, 1981 [JP] Japan .................................. 56-174227

[51] Int. Cl.[4] ........................ G11B 17/04; G11B 5/016
[52] U.S. Cl. ........................................... 360/99; 360/97
[58] Field of Search .................... 360/97, 99, 86, 137,
360/133; 369/77.1–77.2, 261, 270–271

[56] References Cited

U.S. PATENT DOCUMENTS

| | | | |
|---|---|---|---|
| 3,678,481 | 7/1972 | Dalziel et al. | 340/174.1 |
| 3,879,757 | 4/1975 | Elliott et al. | 360/99 |
| 4,040,106 | 8/1977 | Medley | 360/99 |
| 4,405,957 | 9/1983 | Vorbach et al. | 360/99 |
| 4,413,294 | 11/1983 | Beijer | 360/99 |
| 4,445,156 | 4/1984 | Fujimoto | 360/99 |

OTHER PUBLICATIONS

R. E. Baker et al, "Diskette Drive Latch Interlock and Cam Device," IBM Tech. Disc. Bull., Feb. 1976, vol. 18, No. 9, pp. 3020-3021.
J. L. Neubauer et al, "Low Profile Diskette Drive," IBM Tech. Disc. Bull., Mar. 1978, vol. 20, No. 10, pp. 4066-4068.

Primary Examiner—John H. Wolff
Attorney, Agent, or Firm—Woodcock Washburn Kurtz Mackiewicz & Norris

[57] ABSTRACT

A flexible magnetic disc, usually rotatably housed in a square, apertured envelope, is loaded through an entrance slot in the front face of a housing to a preassigned working position for data transfer contact with a pair of transducer heads on its opposite sides. In the working position the disc is engaged between a socketed drive hub assembly driven by a motor and a clamp assembly including a flanged centering cone. Rotatably carrying the clamp assembly, a swing arm is pivotable between a clamping position, where the disc is engaged between the clamp and hub assemblies for joint rotation therewith, and an unclamping position where the clamp assembly disengages the disc. For pivoting the swing arm between the clamping and unclamping positions a hand lever is provided on the front face of the housing and linked to the swing arm. The hand lever is normally oriented approximately parallel to the entrance slot, holding the swing arm in the unclamping position and admitting the disc to be inserted into the slot. When turned 90 degrees to a position where it crosses and blocks the entrance slot, following the insertion of the disc therein, the hand lever causes the swing arm to pivot to the clamping position.

7 Claims, 13 Drawing Figures

RECORDER/REPRODUCER APPARATUS WITH A DISC-SHAPED RECORD MEDIUM

BACKGROUND OF THE INVENTION

My invention relates generally to apparatus for data transfer with disc-shaped record media, and more specifically to apparatus for the recording and/or reproduction of information with use of flexible magnetic discs, now commonly known as floppy discs, which are usually housed in protective envelopes or jackets.

Flexible magnetic discs have found extensive acceptance in the information processing and allied industries as compact data storage media. Being thin and limply flexible, the discs are normally enclosed in more rigid, apertured envelopes to make up disc assemblies or cartridges that are self-supporting.

I am aware of several devices heretofore suggested and used for data transfer to and from flexible magnetic discs. Perhaps most typical of these are those disclosed in U.S. Pat. No. 3,678,481 to Dalziel et al. and U.S. Pat. No. 3,879,757 to Elliott et al. Both of these patents propose devices comprising a casing with a hinged cover and, within the casing, a motor-driven hub assembly and a centering cone or collet disposed opposite to each other. Dalziel et al. teach the mounting of the cone on a shaft supported by a stationary part within the casing. When closed, the hinged cover of the casing bears against the shaft and so urges the cone into engagement with the drive hub assembly via the recording disc tightly captured therebetween. According to Elliott et al., on the other hand, the collet is mounted on the inside surface of the cover. Upon closure of the cover, therefore, the collet is likewise moved into engagement with the drive hub assembly via the recording disc caught therebetween. The disc is then rotated by the drive hub assembly in data transfer contact with a transducer head.

A problem common to both of the above prior art devices arises from the use of the hinged cover for the clamping and unclamping of the recording disc to and from the drive hub assembly. The prior art devices seem to presuppose use in an upstanding position but can obviously be used in a recumbent attitude. When placed recumbently, they do not allow the mounting of other similar devices or any other object thereon. The stacking of similar data storage devices is quite convenient in some instances.

Another objection to the prior art concerns the loading and subsequent clamping of the record disc. A difficulty has been encountered in some conventional devices in making sure that the disc has been loaded and clamped properly. The disc may be ruined if clamped out of axial alignment with the drive hub assembly and the centering cone or the like. Also, in that case, the disc will be rotated eccentrically, making it impossible for the transducer head to scan the tracks on the disc in the intended manner.

SUMMARY OF THE INVENTION

It is an object of my invention to provide a compact, easy-to-use recorder/reproducer apparatus having facilities for positively clamping a recording disc or a disc assembly in position.

Another object of my invention is to eliminate a hinged cover from the apparatus for greater convenience in use.

A further object of my invention is to make possible the easy, clear recognition of whether the disc or the disc assembly is clamped or unclamped in the apparatus.

A still further object of my invention is to preclude the possibility of clamping the disc or the disc assembly in a misaligned state, by incorporating a feature that makes it impossible to clamp the disc or the disc assembly unless it is properly positioned in the apparatus.

Summarized briefly, the recorder/reproducer apparatus in accordance with my invention includes a housing having an entrance slot formed in one face for the insertion and withdrawal of a recording disc along a predetermined plane to and from a preassigned working position therein for a transducing relation with a transducer head. Mounted within the housing are a drive hub assembly and a clamp assembly which are located on the opposite sides of the recording disc received in the housing. The drive hub assembly lies in a fixed position, in concentric relation with the recording disc when the latter is in the working position. The clamp assembly, on the other hand, is rotatably mounted on a swing arm which is pivotable between a clamping position, where the recording disc is engaged in its working position between the clamp assembly and the drive hub assembly for joint rotation therewith, and an unclamping position where the clamp assembly disengages the recording disc. For pivotally moving the swing arm between the clamping and unclamping positions a handle is mounted to the housing, in the immediate proximity of the entrance slot, and is linked to the swing arm. The handle lies off the entrance slot for holding the swing arm in the unclamping position, thereby allowing the insertion and withdrawal of the recording disc into and out of the housing. When manually activated for clamping the inserted recording disc, the handle blocks the entrance slot.

In a preferred embodiment the handle takes the form of a lever pivotally mounted on the front face of the housing in which is formed the entrance slot. The hand lever is oriented parallel to the entrance slot for holding the swing arm in the unclamping position. When turned 90 degrees so as to cross the entrance slot, the hand lever causes the swing arm to pivot to the clamping position. Thus the user can discern from the angular positions of the hand lever whether the swing arm is in the clamping or unclamping position. Moreover, being held across the entrance slot when one recording disc is inserted and clamped in position, the hand lever serves to prevent the erroneous insertion of another recording disc.

Improved operability is another notable advantage of the machine in accordance with my invention. This advantage arises from the fact that both the entrance slot and the hand lever lie on the front panel of the housing. Further the housing has no hinged cover such as those of the above referenced conventional devices, so that a plurality of machines in accordance with my invention may be stacked up, or any desired article may be placed on top of the machine.

According to an additional feature of my invention the hand lever is provided with a pusher for pushing the recording disc, if incompletely inserted in the machine through the entrance slot, fully into the machine upon activation of the hand lever in a direction to clamp the disc. Thus the recording disc is engaged between the clamp and drive hub assemblies only when loaded in the preassigned working position in the machine.

The above and other objects, features and advantages of my invention and the manner of attaining them will become more apparent, and the invention itself will best be understood, from a study of the following description of the preferred embodiment taken in connection with the attached drawings.

DESCRIPTION OF THE PREFERRED EMBODIMENT

The above drawings illustrate the recorder/reproducer apparatus of my invention as adapted for use with flexible magnetic discs encased in protective envelopes, with each disc allowing both of its faces to be information encoded thereon and readable therefrom. With reference to FIGS. 1 through 5 in particular, the illustrated apparatus broadly comprises:

1. A housing 20 accommodating various working parts of the apparatus hereinafter set forth and having an entrance slot 22, FIGS. 2 through 5, formed in its front face 24 for the insertion and withdrawal of a flexible magnetic disc assembly.

2. A drive hub assembly 26, FIGS. 2 and 3, mounted within the housing 20 and driven by an electric motor drive unit 28.

3. A clamp assembly 30, FIGS. 2 and 3, disposed opposite to the drive hub assembly 26 to engage the disc assembly therebetween.

4. A swing arm 32, FIGS. 1 through 3, rotatably carrying the clamp assembly 30 on one end and pivotally supported at the other end by a cantilever spring 34 for moving the clamp assembly into and out of engagement with the drive hub assembly 26 and thus for clamping and unclamping the disc assembly.

5. A handle or hand lever 36, FIGS. 1, 4 and 5, on the front face 24 of the housing 20 for causing the pivotal motion of the swing arm 32.

6. A linkage 38, FIG. 1, operatively connecting the hand lever 36 to the swing arm 32.

Figure 6:
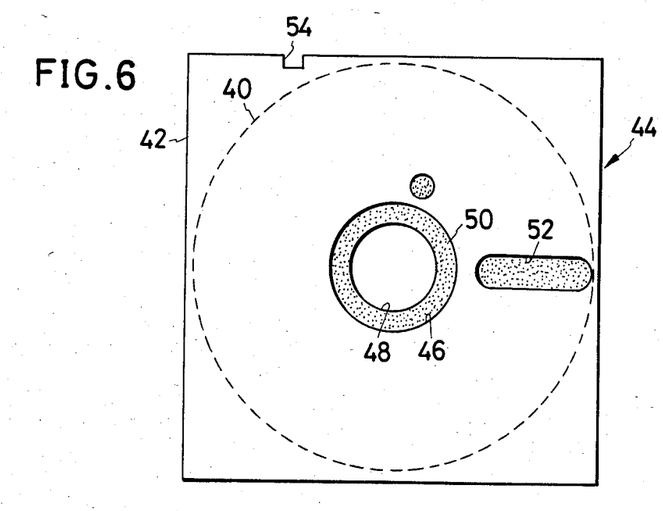
FIG. 6 is a plan of the flexible magnetic disc assembly, comprising a flexible magnetic disc proper and a protective envelope therefor, for use with the apparatus of my invention, the disc assembly being shown on a somewhat reduced scale in comparison with its phantom representations in FIGS. 3 and 5.

Before proceeding further with the description of the apparatus, I will briefly explain the flexible magnetic disc intended for use with the apparatus. In FIG. 6 is shown the magnetic disc 40 rotatably received in a generally square envelope or jacket 42, with the disc and the envelope making up in combination a disc assembly generally referenced 44. The envelope 42 has formed in each of its opposite surfaces a central aperture 46 larger than a concentric central aperture 48 in the magnetic disc 40, thus exposing an annular portion 50 of the disc to be captured between the drive hub assembly 26 and the clamp assembly 30. Also formed in the envelope 42 is an elliptical opening or slot 52 which exposes a radial portion of the magnetic disc 40 for accessing by a magnetic transducer head hereinafter set forth.

It will be noted that the envelope 42 of the disc assembly 44 is shown cut out at 54 in one of its marginal edges. The disc assembly with the cutout 54 means that information is already recorded on its magnetic disc 40 and is not to be erased, or that no new information is to be recorded thereon. I will again refer to the cutout 54 during the description of operation.

With reference back to FIGS. 1 through 3 the housing 20 of the apparatus comprises a frame 56, as of an aluminum die-casting, and integral front 58 and bottom 60 walls, all combined into a generally flat, boxlike shape. The frame 56 includes a partition 62 dividing the interior of the housing into an upper chamber 64 and a lower chamber 66. The upper chamber 64 accommodates the drive hub assembly 26, clamp assembly 30, swing arm 32, etc., whereas the lower chamber 66 has the motor drive unit 28 mounted therein.

Figure 1:
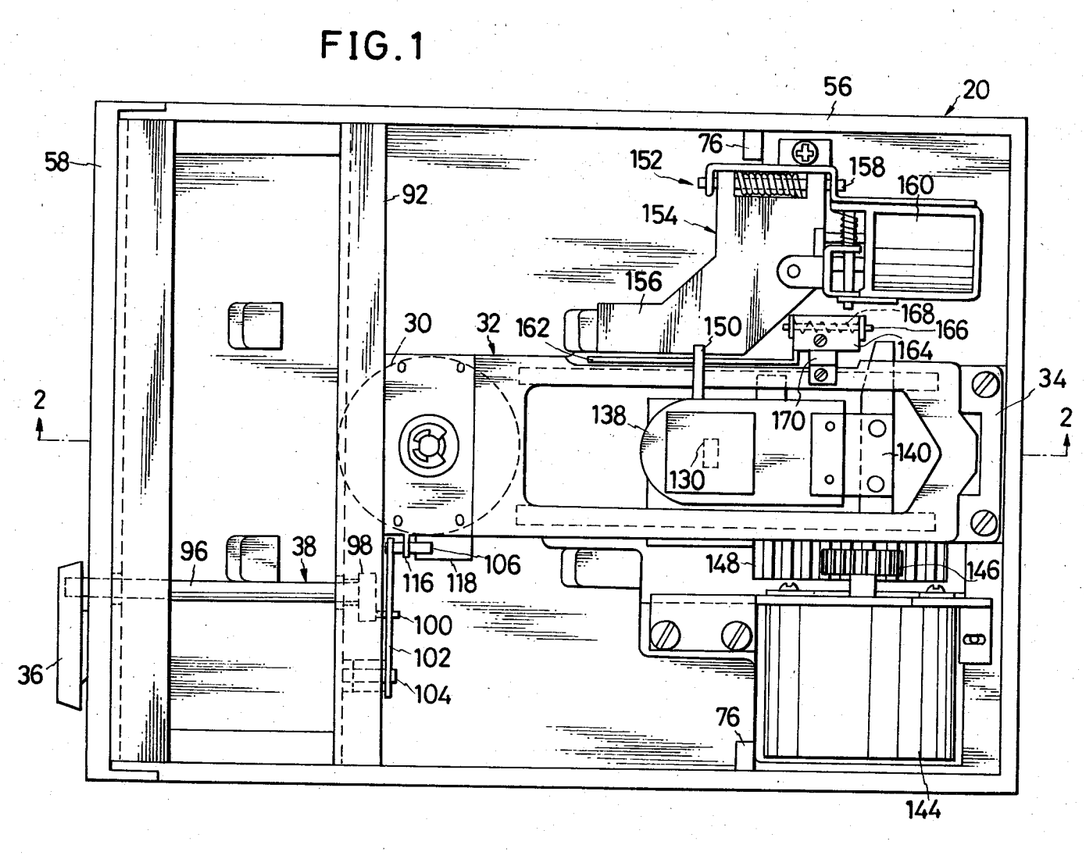
FIG. 1 is a plan of the apparatus constructed in accordance with the principles of my invention, the apparatus being shown with its top cover removed to reveal the inner details.
Figure 2:
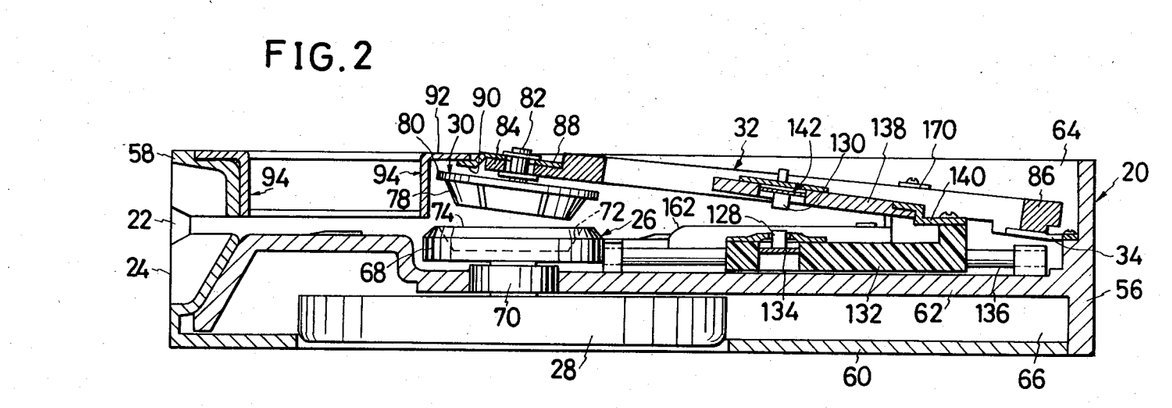
FIG. 2 is a vertical section of the apparatus taken along the line 2—2 of FIG. 1, the apparatus being herein shown in a state ready to receive a flexible magnetic disc assembly.
Figure 3:
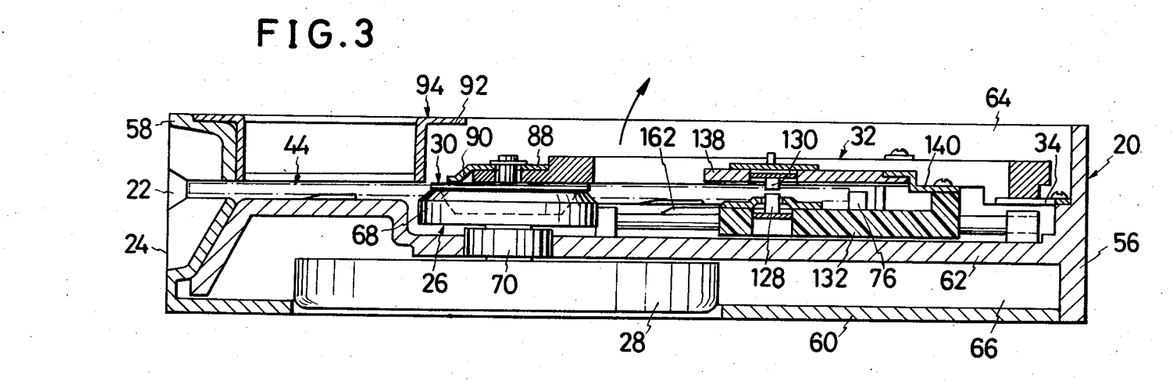
FIG. 3 is a view similar to FIG. 2 except that the apparatus is shown clamping the disc assembly in position.

As best seen in FIG. 2, the drive hub assembly 26 includes a drive hub 68 herein shown mounted directly on the output shaft of the motor drive unit 28 thereby to be rotated about an axis normal to a predetermined (horizontal) plane along which the disc assembly 44 is to be inserted into and withdrawn from the apparatus via the entrance slot 22. The motor drive unit 28 is mounted to and depends from the partition 62 of the housing 20 via a bearing 70. The drive hub 68 has a conical socket 72 formed in its top surface for engagement with the clamp assembly 30 in a manner yet to be described. The annular surface 74 of the drive hub 68, left around the socket 72, is contiguous to the aforesaid predetermined plane for direct contact with the exposed annular portion 50, FIG. 6, of the magnetic disc 40. Further, when the disc assembly 44 is placed in its preassigned working position within the machine, the drive hub assembly 26 is concentric with the flexible magnetic disc 40. FIGS. 1 and 3 show at 76 a pair of limit stops for arresting and holding the disc assembly 44 in the working position.

The clamp assembly 30 lies on the opposite side of the disc assembly 44, when the latter is in the working position, with respect to the drive hub assembly 26. It includes a conical collet 78, complete with a flange or shoulder 80, rotatably mounted on a spindle 82 on the free end 84 of the swing arm 32. Sleeved upon the spindle 82, a spring, not shown, urges the flanged collet 78 away from the swing arm 32.

Supported at its rear end 86 by the cantilever spring 34 on the rear wall of the housing 20 and extending forwardly therefrom, the swing arm 32 is pivotable between an unclamping position of FIG. 2 and a clamping position of FIG. 3. The cantilever spring 34 serves the purpose of biasing the swing arm 32 from the clamping toward the unclamping position, in addition to that of pivotally holding the swing arm. A piece of sheet metal 88 is fastened to the free end 84 of the swing arm 32 to provide a forward extension 90 having slight resiliency. When the swing arm 32 is pivoted in a clockwise direction, as viewed in FIGS. 2 and 3, under the bias of the cantilever spring 34, its forward extension 90 comes into abutment against an overhanging portion 92 of a wall member 94 fastened to the frame 56, thereby retaining the swing arm in the unclamping position as in FIG. 2.

When the swing arm 32 is in the unclamping position of FIG. 2, the clamp assembly 30 is out of engagement with the drive hub assembly 26. Further the clamp assembly is sufficiently spaced from the drive hub assembly to admit of the insertion of the disc assembly 44 to its working position. The swing arm 32 is to be pivoted from the unclamping to the clamping position following the loading of the disc assembly in the machine. In the clamping position of the swing arm represented in FIG. 3, the conical collet 78 of the clamp assembly 30 becomes engaged in the correspondingly shaped socket 72 in the drive hub 68 through the central aperture 48, FIG. 6, in the magnetic disc 40. Also, in the clamping position, the flange 80 on the collet 78 holds the exposed annular portion 50 of the magnetic disc against the annular surface 74 of the drive hub 68. Thus is the magnetic disc tightly captured between the drive hub assembly 26 and the clamp assembly 30, so that it can be revolved within the envelope 42 upon rotation of the motor drive unit 28.

Figure 4:
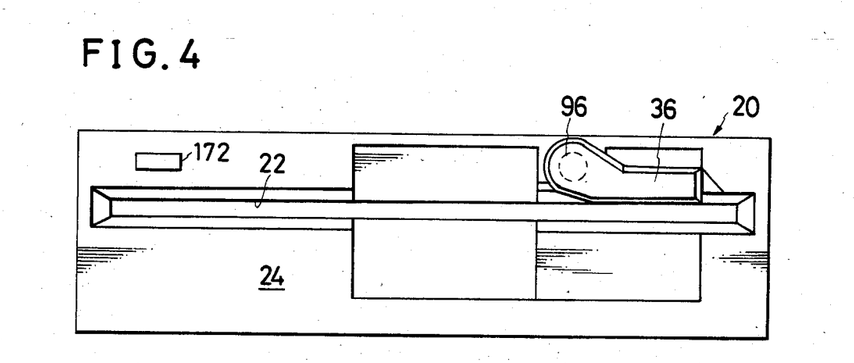
FIG. 4 is a front elevation of the apparatus, as seen from its left hand side in FIGS. 1 through 3, the view showing a hand lever on the front face of the apparatus in a disengaging position corresponding to the state of the apparatus depicted in FIG. 2.
Figure 5:
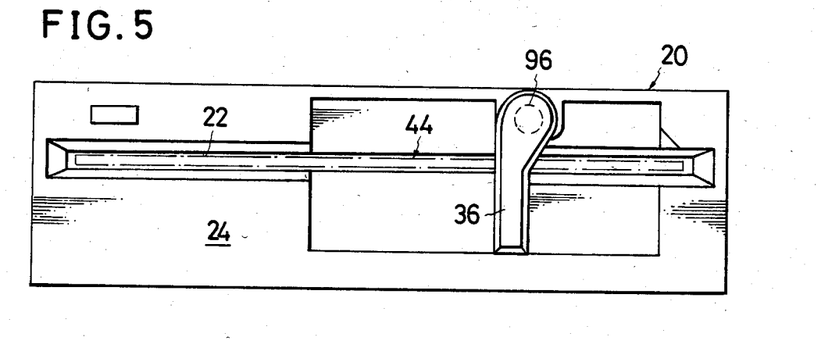
FIG. 5 is a view similar to FIG. 4 except that the hand lever is shown in an engaging position corresponding to the state of the apparatus represented in FIG. 3.

Next to be referred to, with reference directed primarily to FIGS. 4 and 5, is the hand lever 36 on the front face 24 of the housing 20. The hand lever 36 is rigidly mounted at one end on a rotary shaft 96, immediately above the entrance slot 22, for pivotal movement between a disengaging position of FIG. 4 and an engaging position of FIG. 5. When in the disengaging position, the hand lever 36 is oriented approximately parallel to the entrance slot 22, holding the swing arm 32 in the unclamping position as in FIG. 2. The hand lever when in the disengaging position allows, of course, the insertion and withdrawal of the disc assembly into and out of the entrance slot.

When turned 90 degrees in a clockwise direction to the engaging position of FIG. 5, the hand lever 36 causes the aforesaid linkage 38 to move the swing arm 32 from the unclamping to the clamping position. In this engaging position the hand lever 36 extends across the entrance slot 22 and so blocks same against the inadvertent insertion of any other disc assembly.

Figure 7:
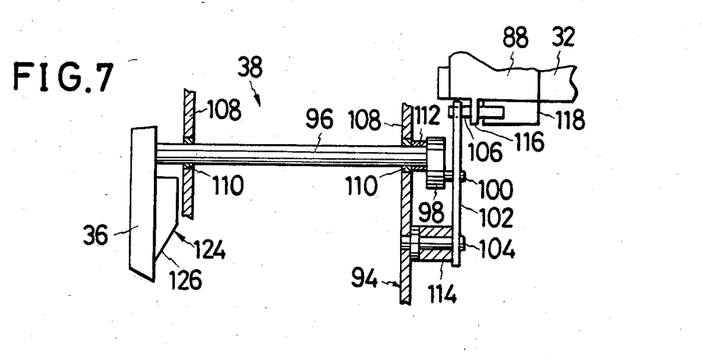
FIG. 7 is a fragmentary plan, partly sectioned for clarity, of a linkage connecting the hand lever of FIGS. 4 and 5 to a swing arm in the apparatus of FIG. 1.

Reference is now directed to FIG. 7 in order to explain the general configuration of the linkage 38 connecting the hand lever 36 to the swing arm 32 for causing the pivotal movement of the swing arm between the clamping and unclamping positions in response to the manual activation of the hand lever between the engaging and disengaging positions. The linkage 38 comprises:

1. The noted rotary shaft 96 having the hand lever 36 on one end thereof.
2. A crank web 98 on the other end of the rotary shaft 96.
3. A crankpin 100 projecting from the crank web 98 in offset relation to the rotary shaft 96.
4. A lever 102 pivotally mounted at one end on a pin 104 affixed to the wall member 94, the lever being further operatively engaged at its midportion with the crankpin 100 and having a pin 106 planted right-angularly on its other end for engagement with the swing arm 32.

The rotary shaft 96 extends through the two opposed, upstanding portions 108 of the wall member 94 and is thereby rotatably supported via sleeve bearings 110. A sleeve 112 is fitted by way of a spacer over the portion of the shaft 96 projecting rearwardly of the rear upstanding wall portion 108. Another sleeve 114 is fitted over the pivot pin 104 of the lever 102 for the same purpose.

Figure 8:
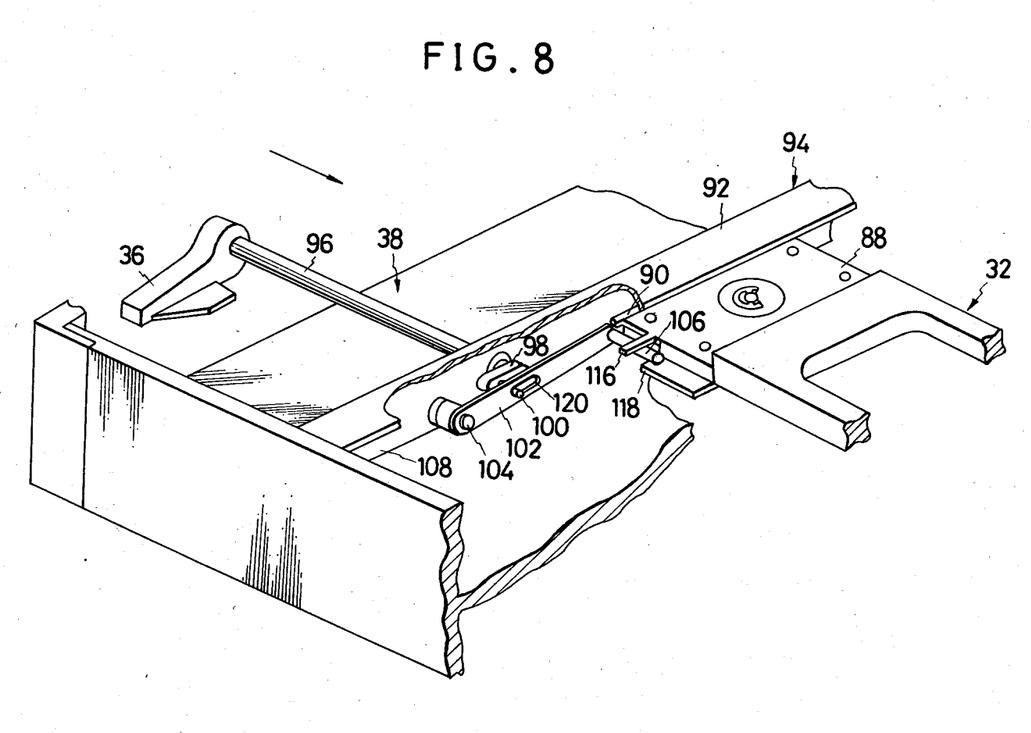
FIGS. 8, 9 and 10 are a series of enlarged, fragmentary perspective views explanatory of sequential steps in the operation of the linkage of FIG. 7.
Figure 9:
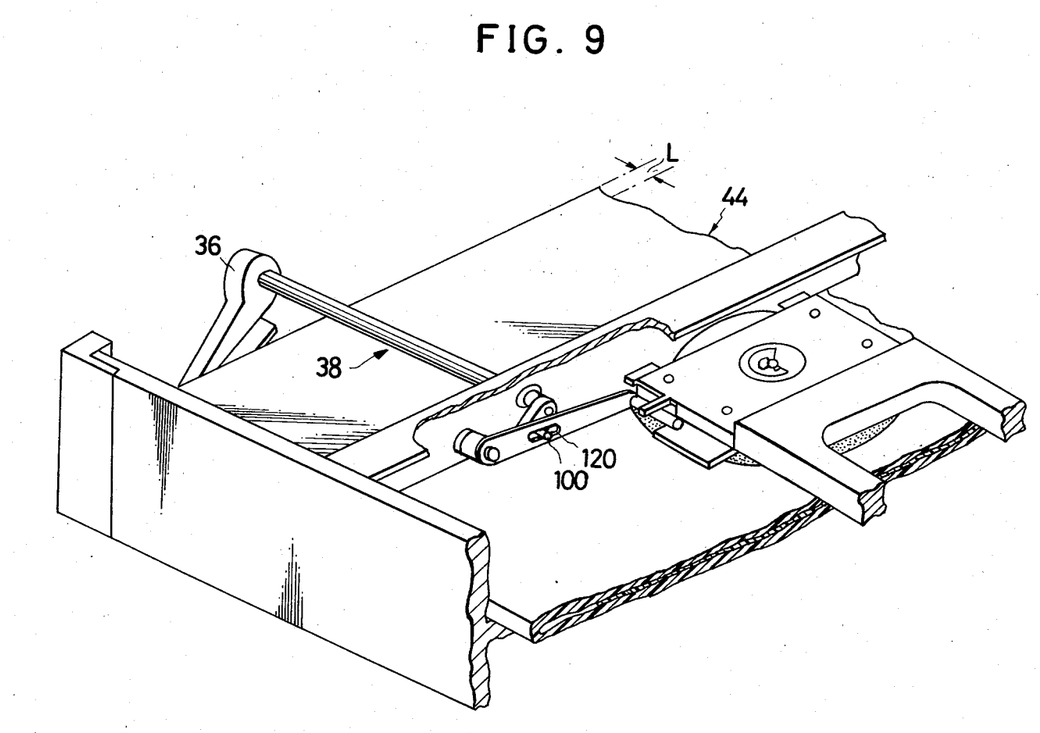
Figures 10, 11:
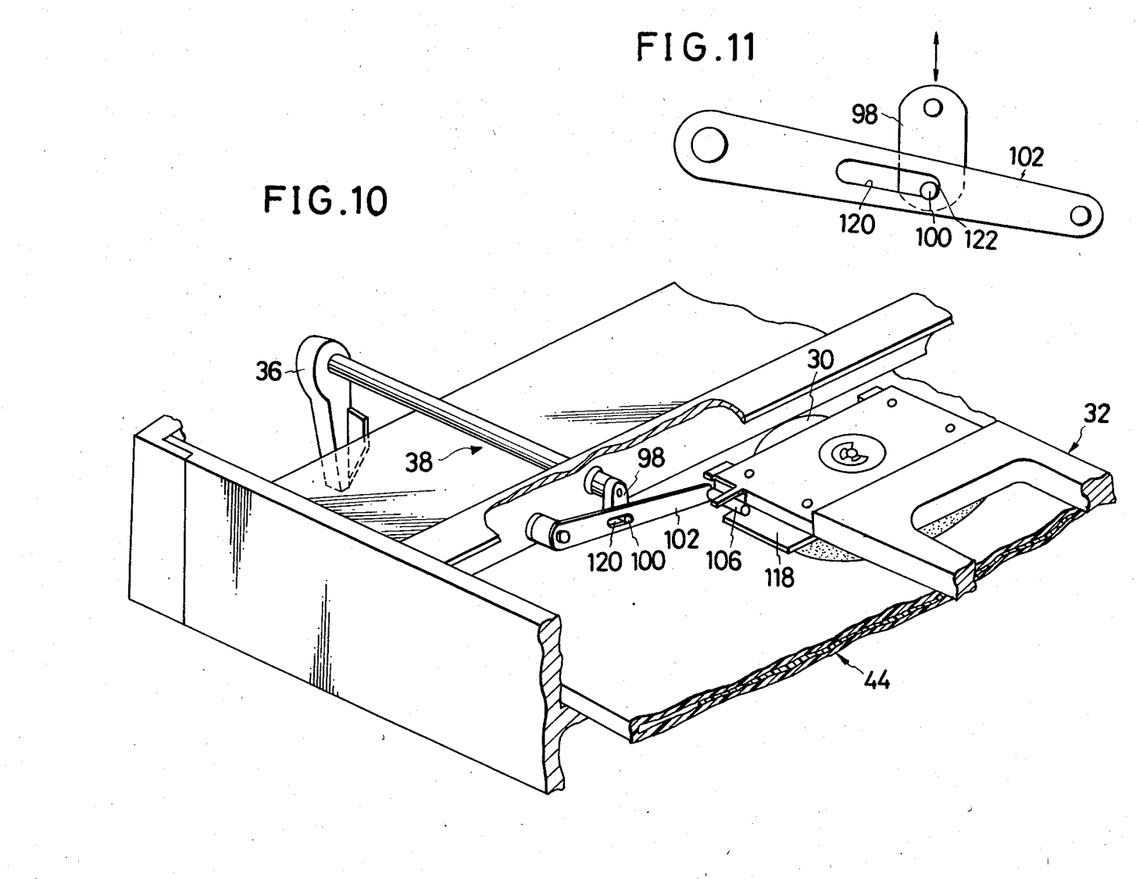
FIG. 11 is a rear elevation, drawn on a still more enlarged scale, of part of the linkage in the state of FIG. 10.

FIGS. 8, 9 and 10 illustrate in perspective the linkage 38 in different steps of operation, with the hand lever 36 being shown in the disengaging position of FIG. 8, midway between the disengaging and engaging positions in FIG. 9, and in the engaging position in FIG. 10. With particular reference to FIG. 8 it will be noted that the rotary shaft 96 extends in the arrow-marked direction in which the disc assembly is to be inserted in the apparatus. The crankweb 98 extends in the same direction as the hand lever 36. The pin 106 on the free end of the lever 102 is slidably engaged between two lateral projections 116 and 118 of the swing arm 32. These lateral projections are spaced from each other in the thickness direction of the swing arm and formed integral with the piece of sheet metal 88 thereon.

In this particular embodiment the lever 102 has a slot 120 formed longitudinally in its midportion for slidably receiving the crankpin 100. Thus, with the manual turn of the hand lever 36, the crankpin 100 slides along the slot 120 thereby causing the pivotal movement of the lever 102 in a vertical plane. The slot 120 is longitudinally dimensioned to limit the sliding movement of the crankpin 100 in the engaging and disengaging positions of the hand lever 36. When the hand lever is in the disengaging position as in FIG. 8, the crankpin 100 is held against the left hand extremity, as seen in this figure, of the slot 120, with the result that the lever 102 is approximately in coplanar relationship to the hand lever 36 and the crank web 98. Then the swing arm 32 lies in the unclamping position, with its forward extension 90 abutting against the overhang 92 of the wall member 94 under the bias of the cantilever spring 34. The crankpin 100 slides rightwardly of the slot 120, as in FIG. 9, with the turn of the hand lever 36 from the disengaging toward the engaging position. Thus, in the engaging position of the hand lever pictured in FIG. 10, the crankpin 100 hits the right hand extremity of the slot 120. Now the hand lever 36 and the crank web 98 are both oriented perpendicularly, that is, parallel to the plane along which the swing arm 32 is pivoted between the clamping and unclamping positions. The swing arm 32 is in the clamping position, engaging the inserted disc assembly 44 with the clamp assembly 30.

As shown on an enlarged scale in FIG. 11, the slot 120 in the lever 102 is formed to include an offset recess 122 at its ,ight hand extremity in which the crankpin 100 is releasably engaged when the hand lever 36 is in the engaging position as in FIG. 10. Thus the hand lever comes to a click stop in the engaging position. The recess 122 serves to firmly retain the swing arm in the clamping position against the force of the cantilever spring.

According to a further feature of my invention the hand lever 36 has a pusher 124, as seen for example in FIG. 7, projecting rearwardly, or toward the housing, therefrom. The pusher 124 has a sloping edge 126 for direct sliding contact with one edge of the envelope 42 of the disc assembly 44.

Figure 12:
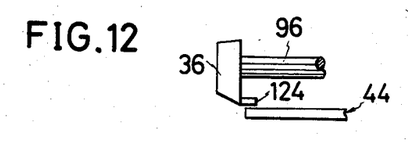
FIG. 12 is an elevation showing the positional relationship between the hand lever with an integral pusher and the disc assembly inserted incompletely in the apparatus, as seen from the right hand side of FIG. 4.
Figure 13:
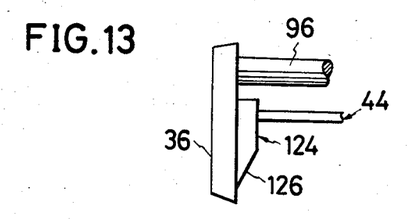
FIG. 13 is a view similar to FIG. 12 except that the hand lever is shown in the engaging position of FIG. 5, with the disc assembly pushed fully into the apparatus by the pusher.

The pusher 124 will serve no useful purpose if the disc assembly is manually inserted fully into the entrance slot of the housing, that is, into abutment against the pair of limit stops 76 of FIGS. 1 and 3. The user may, however, incompletely insert the disc assembly into the entrance slot. FIG. 12 illustrates the disc assembly 44 inserted incompletely, with the pusher 124 overlying the projecting portion of the disc assembly when the hand lever 36 is in the disengaging position. Then, upon manipulation of the hand lever 36 from the disengaging to the engaging position, the pusher 124 will slidingly engage the projecting disc assembly 44 with its sloping edge 126 thereby pushing the disc assembly fully into the machine. FIG. 13 shows the disc assembly 44 thus fully inserted into the machine as the hand lever 36 reaches the engaging position.

Referring back to FIGS. 1 through 3, I will briefly describe transducer heads and other means associated therewith, as incorporated in this recorder/reproducer apparatus. As has been mentioned, the disc assembly for use with the apparatus is of the type allowing data to be written on and read out from both faces of the magnetic disc. Accordingly the illustrated machine has two transducer heads 128 and 130 on the opposite sides of the disc assembly 44 in its working position. The lower transducer head 128 is mounted directly on a carriage 132 via a spring 134 capable of supporting the head in a gimbal fashion. The carriage 132 is slidably mounted on a pair of guide rails 136 extending radially of the flexible magnetic disc of the disc assembly 44 in its working position, or in the direction in which the disc assembly is inserted in and withdrawn from the apparatus.

In order to expedite the loading and unloading of the disc assembly the upper transducer head 130 is mounted to an arm 138 which is pivoted on the carriage 132 via a cantilever spring 140 and which is thereby biased in a counterclockwise direction as viewed in FIGS. 2 and 3. A gimbal spring 142 is also used for resiliently mounting the upper transducer head 130 on the arm 138 (hereinafter referred to as the upper head arm in contradistinction to the swing arm 32 carrying the clamp assembly 30). It is thus seen that both lower 128 and upper 130 transducer heads are movable radially of the flexible magnetic disc. Adopted for such travel of the transducer heads is an electric motor 144 having a pinion 146 on its output shaft for engagement with a rack 148 attached to the carriage 132.

For causing the pivotal motion of the upper head arm 138 in step with that of the swing arm 32, a pin 150 projects laterally from the upper head arm and overlies the swing arm. The pin 150 is normally held against the swing arm 32 from above under the bias of the cantilever spring 140. Consequently, with the movement of the swing arm 32 from the unclamping to the clamping position, the upper head arm 138 pivots counterclockwise together with the upper transducer head 130 thereon. Thus is the flexible magnetic disc caught between the two transducer heads 128 and 130 through the radial slots 52, FIG. 6, in the envelope 42 when engaged between the drive hub assembly 26 and the clamp assembly 30.

In the use of the recorder/reproducer apparatus the need arises for moving the upper transducer head 130 out of contact with the magnetic disc without unclamping the disc, as is well known to the specialists. This requires the provision of a mechanism, aside from the swing arm 32, for controlling the movement of the upper transducer head 130 into and out of contact with the magnetic disc.

The upper head control mechanism is shown in FIG. 1 and therein generally designated 152. The upper head control mechanism 152 includes an L-shaped lever 154 having a portion 156 extending alongside the swing arm 32 and pivotally mounted on a horizontally extending shaft or pin 158. The pin 150 projecting laterally from the upper head arm 138 extends beyond a side edge of the swing arm 32 and overhangs the portion 156 of the L-shaped lever 154. The L-shaped lever is operatively coupled to a solenoid actuator 160 thereby to be pivoted about the pivot pin 158. Accordingly, when the swing arm 32 is in the clamping position, the upper transducer head 130 can be either in or out of contact with the magnetic disc depending upon whether the solenoid actuator 160 is energized or deenergized.

Seen at 162 in FIGS. 1 through 3 is an elongate disc guide extending along one side of the swing arm 32. The disc guide 162 has an inverted-U-shaped base portion 164 pivotally mounted on a pin 166 oriented horizontally and parallel to the disc guide. Sleeved upon the pivot pin 166, a torsion spring 168 urges the disc guide downwardly. A lug 170 projecting from the swing arm 32 engages the base portion 164 of the disc guide 162 from below.

When the swing arm 32 is in the unclamping position of FIG. 2, the lug 170 on the swing arm holds the disc guide 162 in a guiding position against the force of the torsion spring 168. In this guiding position the disc guide is contiguous to the aforesaid predetermined plane along which has the disc assembly is loaded into and unloaded from the machine. In the clamping position of the swing arm 32 shown in FIG. 3, on the other hand, the lug 170 allows the torsion spring 168 to pivot the disc guide 162 to a nonguiding position some distance below the working position of the disc assembly.

Although the operation of the recorder/reproducer apparatus embodying my invention is believed to be apparent from the foregoing, some amplification will be made in the following brief summary of such operation. The hand lever 36 is assumed to occupy the horizontal disengaging position, as in FIGS. 4 and 8, prior to the insertion of the disc assembly. With the hand lever in the disengaging position the lever 102 of the linkage 38 is oriented horizontally, as in FIG. 8, allowing the swing arm 32 to assume the unclamping position of FIG. 2 by the force of the cantilever spring 34. The forward extension 90 of the swing arm bears against the overhang 92 of the wall member 94. The hand lever 36 does not block the entrance slot 22 when in the disengaging position, so that the disc assembly is insertable.

The user may insert the disc assembly 44 into the entrance slot 22, with the right hand edge (as seen in FIG. 6) of the disc assembly foremost, as indicated by the arrow in FIG. 8. He may fail to fully insert the disc assembly, leaving a certain trailing end portion thereof projecting out of the entrance slot. However, if the length L, FIG. 9, of this projecting end portion of the disc assembly is less than a limit determined by the shape, size and position of the pusher 124, the disc assembly will be loaded properly in the apparatus by the subsequent manipulation of the hand lever 36, together with the pusher thereon, from the disengaging to the engaging position.

If the length L of the projecting end portion of the disc assembly exceeds the above limit, on the other hand, then the hand lever 36 will strike the disc assembly on being turned toward the engaging position. The user can then recognize the incomplete insertion of the disc assembly as he cannot possibly turn the hand lever any further. Thus my invention precludes the possibility of eccentrically engaging the disc assembly between the drive hub 26 and clamp 30 assemblies.

As the user operates the hand lever 36 from the disengaging to the engaging position, the latter position being shown in FIG. 10, the crankpin 100 slides from one extremity of the slot 120 in the lever 102 to the other thereby causing the lever 102 to pivot through the required angle. The pin 106 on the free end of the lever 102 acts now on the lower lateral projection 118 of the swing arm 32 thereby forcing the swing arm down to the clamping position of FIG. 3 against the force of the cantilever spring 34.

In the clamping position of the swing arm 32 the conical collet 78 of the clamp assembly 30 becomes engaged in the socket 72 in the drive hub 68 through the central aperture 48, FIG. 6, in the flexible magnetic disc 40 of the disc assembly 44. Further the exposed annular portion 50 of the magnetic disc becomes captured between the annular surface 74 of the drive hub 68 and the flange 80 of the collet 78.

It should be appreciated that my invention requires no means acting directly on the swing arm 32, or on the clamp assembly 30, for retaining the swing arm in the clamping position in opposition to the effect of the cantilever spring 34. As will be seen by referring again to FIG. 11, the crankpin 100 becomes engaged in the offset recess 122 in the lever 102 when the crank web 98 acquires the vertical attitude in the engaging position of the hand lever 36 (or in the clamping position of the swing arm 32). The crank web will stay in the vertical position even after the operator has released the hand lever in the engaging position. This is because the force exerted upon the crank web by the lever 102 owing to the bias of the cantilever spring 34 acts almost wholly in a vertical direction, that is, in the longitudinal direction of the crank web. The force due to the cantilever spring 34 hardly acts in the direction to cause the rotation of the crank web in a clockwise direction as viewed in FIG. 11. The slot 120 itself restrains the crank web from rotation in a counterclockwise direction beyond the illustrated vertical position.

In spite of the showings of the drawings the slot 120 may not necessarily be used to determine the two extreme angular positions of the crank web 44. The same purpose could be attained by means of stops formed on a stationary part of the apparatus.

The recess 54 shown in FIG. 6 may be formed in the envelope 42 of the disc assembly 44 loaded in the apparatus as above, if the flexible magnetic disc 40 of the disc assembly already bears information that is not to be erased. For detecting the presence or absence of the recess 54 the apparatus has a light source and a photodetector, both not shown, disposed on the opposite sides of the disc assembly mounted in its working position. When irradiated by the light source through the recess 54, the photodetector causes an indicator 172, FIG. 4, on the front face of the housing to make a visual indication to that effect.

The operator may turn the hand lever 36 back toward the disengaging position of FIG. 4 for causing the clamp assembly 30 to disengage the disc assembly 44. This causes the crankpin 100 of the linkage 38 to move out of the recess 122 at one extremity of the slot 120 in the lever 102 and hence to become free to slide toward the other extremity of the slot. Thereupon the swing arm 32 is pivoted from the clamping position of FIG. 3 to the unclamping position of FIG. 2 by the effect of the cantilever spring 34, by the manual actuating force exerted on the hand lever 36, or by both. The clamp assembly 30 moves out of engagement with the drive hub assembly 26 upon pivotal movement of the swing arm 32 to the unclamping position. Now the operator may withdraw the disc assembly out of the machine through the entrance slot 22.

The illustrated embodiment of my invention possesses the following advantages, in addition to those already set forth in the Summary of the invention:

1. The swing arm 32 is moved between the clamping and unclamping positions by the hand lever 36 via the linkage 38 generally extending horizontally therebetween, so that the thickness or height of the housing 20 is reduced to a minimum.
2. The swing arm 32 can be locked in the clamping position against the bias of the cantilever spring 34 simply as the crankpin 100 is engaged in the offset recess 122 at one extremity of the slot 120 in the lever 102, with the crank web 98 oriented perpendicular to the plane of the clamped recording disc. No hook or similar device acting on the swing arm or the clamp assembly is required, so that the apparatus is materially simplified in construction.
3. The hand lever 36 cannot possibly be turned from the disengaging to the engaging position if the inserted disc assembly projects too much out of the entrance slot 22. If the disc assembly projects rather slightly out of the entrance slot, on the other hand, then it is automatically pushed fully into the machine as the hand lever is manipulated to the engaging position. There is accordingly no possibility of the disc assembly being clamped out of position.

Although I have shown and described my invention in terms of but one embodiment thereof adapted for use with a flexible magnetic disc encased in a protective envelope, I understand, of course, that my invention is not to be limited by the exact details of the disclosed embodiment. A variety of modifications and adaptations will readily occur to the specialists within the broad teaching thereof. The following is a brief list of such possible changes:

1. Recording discs for use with the apparatus of my invention need not necessarily be of the magnetic type but can, for example, be of the optical variety.
2. The recording discs need not be encased but may be bare.

3. The drive hub may have a spindle, instead of the socket, for insertion in the central aperture in each recording disc.

4. The swing arm carrying the clamp assembly may be mounted on a pivot pin, instead of the cantilever spring, and separate resilient means may be adopted for biasing the swing arm toward the unclamping position.

All these and other changes of the invention are intended in the foregoing disclosure; therefore, my invention is to be limited only by the terms of the claims which follow.

What I claim is:

1. A recorder/reproducer apparatus wherein a disc assembly is brought into transducing relation with a transducer head, the disc assembly having a recording disc rotatably encased in an envelope having central apertures formed in its opposite faces to partly expose the recording disc, the envelope also having an opening for allowing access of the transducer head to the recording disc, the apparatus comprising:
   (a) a housing having an entrance slot for the insertion and withdrawal of the disc assembly along a predetermined plane to and from a preassigned working position in the housing for the transducing relationship with the transducer head;
   (b) a drive hub assembly mounted within the housing in a concentric relation with the recording disc of the disc assembly when the latter is in the working position, the drive hub assembly being contiguous to a predetermined plane;
   (c) a clamp assembly disposed on the opposite side of the disc assembly with respect to the drive hub assembly; and
   (d) a swing arm rotatably carrying the clamp assembly and mounted within the housing for pivotal motion between a clamping position, where the clamp assembly engages between itself and the drive hub assembly the exposed portions of the recording disc through the central apertures of the envelope of the disc assembly in its working position, and an unclamping position where the clamp assembly disengages the recording disc, the clamp assembly being rotatable about a common access with the recording disc and the drive hub assembly when the swing arm is in the clamping position;
   (e) drive means coupled to the drive hub assembly for rotating the same whereby the recording disc is rotated within the envelope jointly with the drive hub assembly and the clamp assembly when the swing arm is in the clamping position;
   (f) a handle mounted to the housing, in the immediate proximity of the entrance slot, for pivotal motion about an access parallel to the predetermined plane between an engaging position for engagement of the recording disc between the clamp assembly and the drive hub assembly and a disengaging position for the disengagement of the recording disc therefrom, the handle blocking the entrance slot against the passage of the disc assembly when in the engaging position and being held off the entrance slot when in a disengaging position; and
   (g) a pusher on the handle for pushing the disc assembly, when the latter is incompletely inserted in the entrance slot, fully into the housing upon pivotal motion of the handle from the disengaging to the engaging position, the pusher having a sloping edge for sliding engagement with the disc assembly when the latter is being pushed into the housing, and a nonsloping edge for holding the disc assembly fully inserted in the housing when the handle is in the engaging position;
   (h) a linkage operatively connecting the handle to the swing arm for shifting the latter from the unclamping to the clamping position upon pivotal motion of the handle from the disengaging to the engaging position and for shifting the swing arm from the clamping to the unclamping position upon pivotal motion of the handle from the engaging to the disengaging position;
   (i) a disc guide mounted within the housing for pivotal movement between a guiding position, where the disc guide is contiguous to the predetermined plane for guiding the recording disc during insertion and withdrawal thereof to and from the working position, and a nonguiding position where the disc guide is away from the predetermined position;
   (j) resilient means biasing the guide means from the guiding to the nonguiding position; and
   (k) means on the swing arm for pivoting the disc guide from the nonguiding to the guiding position against the bias of the resilient means upon pivotal movement of the swing arm from the clamping to the unclamping position and for allowing the disc guide to pivot from the guiding to the nonguiding position under the bias of the resilient means upon pivotal movement of the swing arm from the unclamping to the clamping position.

2. The recorder/reproducer apparatus as recited in claim 1, further comprising resilient means biasing the swing arm from the clamping toward the unclamping position, the linkage being adapted to retain the swing arm in the clamping position against the bias of the resilient means when the handle is in the engaging position.

3. The recorder/reproducer apparatus as recited in claim 1, wherein the swing arm is pivoted by a cantilver spring biasing the swing arm from the clamping toward the unclamping position.

4. The recorder/reproducer apparatus as recited in claim 1, wherein the linkage comprises:
   (a) a rotary shaft mounted to the housing and having the handle fixedly mounted on one end thereby to be revolved about its own axis through a predetermined angle;
   (b) a crank web on the other end of the rotary shaft;
   (c) a crankpin projecting from the crank web in eccentric relationship to the rotary shaft;
   (d) a lever pivotally mounted to the housing and operatively engaged with the crankpin thereby to be pivoted through an angle determined by the angle of revolution of the rotary shaft, the lever being further operatively engaged with the swing arm for pivoting same between the clamping and unclamping positions in response to the angular movement of the handle between the engaging and disengaging positions.

5. The recorder/reproducer apparatus as recited in claim 4, wherein the crankpin is slidably engaged in a slot formed in the lever.

6. The recorder/reproducer apparatus as recited in claim 5, wherein the slot in the lever is sized to limit the sliding movement of the crankpin in the engaging and disengaging positions of the handle.

7. The recorder/reproducer apparatus as recited in claim 6, wherein the swing arm is biased from the clamping toward the unclamping position by resilient means, and wherein the slot in the lever is formed to include an offset recess at one extremity in which the crankpin is releasably engaged when the handle is in the engaging position, whereby the swing arm is firmly retained in the clamping position against the bias of the resilient means when the handle is in the engaging position.

* * * * *